(12) United States Patent
Agarwal et al.

(10) Patent No.: US 7,823,134 B2
(45) Date of Patent: *Oct. 26, 2010

(54) EARLY WARNING MECHANISM FOR ENHANCING ENTERPRISE AVAILABILITY

(75) Inventors: Anant Agarwal, Weston, MA (US); Andrew E. Ayers, Amherst, NH (US); Richard Schooler, Cambridge, MA (US)

(73) Assignee: Symantec Operating Corporation, Mountain View, CA (US)

( * ) Notice: Subject to any disclaimer, the term of this patent is extended or adjusted under 35 U.S.C. 154(b) by 995 days.

This patent is subject to a terminal disclaimer.

(21) Appl. No.: 10/857,074

(22) Filed: May 28, 2004

(65) Prior Publication Data

US 2004/0220774 A1 Nov. 4, 2004

Related U.S. Application Data

(63) Continuation of application No. 09/474,679, filed on Dec. 29, 1999, now Pat. No. 6,745,383.

(51) Int. Cl.
*G06F 9/44* (2006.01)
(52) U.S. Cl. .............. 717/127; 717/124; 717/130; 717/131; 714/38
(58) Field of Classification Search .............. 717/124, 717/130, 131
See application file for complete search history.

(56) References Cited

U.S. PATENT DOCUMENTS

| | | |
|---|---|---|
| 3,711,863 A | 1/1973 | Bloom |
| 4,667,290 A | 5/1987 | Goss et al. |
| 4,819,233 A | 4/1989 | Delucia et al. |
| 4,951,195 A | 8/1990 | Fogg, Jr. et al. |

(Continued)

FOREIGN PATENT DOCUMENTS

EP 0 403 415 12/1990

(Continued)

OTHER PUBLICATIONS

Leon Stucki and Gary Foshee, "New Assertion Concepts for Self-Metric Software Validation", 1975, ACM SiGPLAN Notices, vol. 10, Issue 6, pp. 59-71.*

(Continued)

*Primary Examiner*—Lewis A Bullock, Jr.
*Assistant Examiner*—Jue Wang
(74) *Attorney, Agent, or Firm*—Meyertons, Hood, Kivlin, Kowert & Goetzel, P.C.

(57) ABSTRACT

A computer method for issuing an early warning includes determining, using change and test coverage and control flow and data flow analyses of a program, locations in the program at which to insert early warning (EW) code to monitor for an event. The program is instrumented with EW code which monitors for the event, by inserting EW code at the determined locations. Upon detecting the event, EW code performs an early action warning, or issues an early action. Early warnings are issued when an EW-instrumented block is reached. Issuance of an early warning action can be conditional upon execution of the program in a particular environment, such as a production environment. Issuance of an EW can also be conditional upon executing an untested block of code that was recently modified.

21 Claims, 5 Drawing Sheets

U.S. PATENT DOCUMENTS

| | | | |
|---|---|---|---|
| 5,117,352 A * | 5/1992 | Falek | 714/4 |
| 5,119,377 A * | 6/1992 | Cobb et al. | 714/38 |
| 5,146,586 A | 9/1992 | Nakano | |
| 5,191,646 A | 3/1993 | Naito et al. | |
| 5,241,678 A | 8/1993 | Futamura et al. | |
| 5,265,254 A | 11/1993 | Blasciak et al. | |
| 5,321,828 A | 6/1994 | Phillips et al. | |
| 5,327,568 A * | 7/1994 | Maejima et al. | 717/147 |
| 5,359,608 A * | 10/1994 | Belz et al. | 714/38 |
| 5,428,786 A | 6/1995 | Sites | |
| 5,446,878 A | 8/1995 | Royal | |
| 5,450,586 A | 9/1995 | Kuzara et al. | |
| 5,488,714 A | 1/1996 | Skidmore | |
| 5,507,030 A | 4/1996 | Sites | |
| 5,539,907 A * | 7/1996 | Srivastava et al. | 717/130 |
| 5,546,586 A | 8/1996 | Wetmore et al. | |
| 5,615,369 A | 3/1997 | Holler | |
| 5,675,803 A | 10/1997 | Preisler et al. | |
| 5,732,273 A | 3/1998 | Srivastava et al. | |
| 5,732,275 A | 3/1998 | Kullick et al. | |
| 5,758,061 A | 5/1998 | Plum | |
| 5,764,992 A | 6/1998 | Kullick et al. | |
| 5,790,858 A | 8/1998 | Vogel | |
| 5,802,373 A | 9/1998 | Yates et al. | |
| 5,812,855 A | 9/1998 | Hiranandani et al. | |
| 5,870,607 A | 2/1999 | Netzer | |
| 5,966,541 A | 10/1999 | Agarwal | |
| 5,978,588 A | 11/1999 | Wallace | |
| 6,018,747 A | 1/2000 | Burns et al. | |
| 6,071,316 A | 6/2000 | Goosen et al. | |
| 6,085,244 A * | 7/2000 | Wookey | 709/224 |
| 6,106,571 A * | 8/2000 | Maxwell | 717/131 |
| 6,138,270 A | 10/2000 | Hsu | |
| 6,202,199 B1 | 3/2001 | Wygodny et al. | |
| 6,216,237 B1 | 4/2001 | Klemm et al. | |
| 6,282,701 B1 | 8/2001 | Wygodny et al. | |
| 6,405,327 B1 * | 6/2002 | Sipple et al. | 714/39 |
| 6,481,008 B1 * | 11/2002 | Chaiken et al. | 717/158 |
| 6,598,223 B1 * | 7/2003 | Vrhel et al. | 717/174 |
| 6,895,578 B1 * | 5/2005 | Kolawa et al. | 717/130 |

FOREIGN PATENT DOCUMENTS

| | | |
|---|---|---|
| EP | 0 286 361 | 10/1998 |
| EP | 0 372 835 | 12/1998 |
| WO | 90/01738 | 2/1990 |
| WO | 00/11549 | 3/2000 |
| WO | 00 54385 | 9/2000 |

OTHER PUBLICATIONS

Christina Pavlopoulou, "Residual Coverage Monitoring of Java Programs", Aug. 1997, Master of Science Thesis, Perdue University, retrieved from: http://www.cs.uoregon.edu/research/perpetual/dasada/Papers/Pavlopoulou-MSthesis.pdf.*

Puketza et al., "A Methodology for Testing Intrusion Detection Systems," IEEE Transactions, vol. 22, Issue: 10, pp. 719-729, Oct. 1996.

Puketza et al., "A Software Platform for Testing Intrusion Detection Systems," IEEE, vol. 14, Issue: 5, pp. 43-51, Oct. 1997.

Robert C. Bedichek, "Some Efficient Architecture Simulation Techniques," Department of Computer Sciences, University of Washington, Usenix Conference, Jan. 1990.

Robert C. Bedicheck, "Talisman: Fast and Accurate Multicomputer Simulation," 1985, Laboratory for Computer Science, Massachusetts Institute of Technology.

Colin Hunter, et al., "DOS at RISC," Byte, Nov. 1989, pp. 361-368.

Anant Agarwal, et al., "ATUM: A New technique for Capturing Address Traces Using Microcode," Proceedings of the 13th Annual Symposium on Computer Architecture, Jun. 1986.

Kazuhito, Patch System, Patent Abstract of Japan (CD-ROM), Unexamined Applications, vol. 94, No. 11 (Nov. 8, 1994).

International Business Machines Corporation, Generic Methodology for Code Patching in Binary File, 802-803 (Jun. 1998).

Ammons, G., and Larus, J., "Improving Data-flow Analysis with Path Profiles," ACM Sigplan Notices, US, Association for Computing Machinery, 33(5): 72-84 (1998).

Ball, T. and Larus, J.R., "Optimally Profiling and Tracing Programs," Technical Report #1031, Rev. 1, Computer Sciences Department, University of Wisconsin—Madison, Sep. 1991.

"Instruction Trace Apparatus. Feb. 1978,"IBM Technical Disclosure Bulletin, 20(9): 1-3 (Feb. 1, 1978).

Rosen, Kenneth H., et al., *UNIX System V Release 4: An Introduction for New and Experienced Users*, pp. 441-442, Osborne McGraw-Hill (1990).

Aho, Alfred V., et al., "Compilers—Principles, Techniques and Tools," pp. 429-440 and 475-480, Addison-Wesley Publishing Company, (reprinted Mar. 1988).

Ferrante, J., et al., The Program Dependence Graph and Its Use in Optimization, pp. 320-349.

Johnson, R., et al., "Dependence-Based Program Analysis," pp. 78-89.

Aho, Alfred V., Compilers, Principles, Techniques, and Tools, pp. 513-580.

Ambras, J.P. et al., "Microscope: An Integrated Program Analysis Toolset," *Hewlett-Packard Journal*, 4:71-82 (Aug. 1, 1988).

Lucas, C., et al., "Managing Software Evolution Through Reuse Contracts," Programming Technology Lab, Vrije Universiteit Brussel, IEEE: 165-168 (1997). Retrieved from the IEEE database on Sep. 4, 2002.

Rothermel, G., and Harrold, J.J., "A Safe, Efficient Regression Test Selection Technique," *ACM Transactions on Foftware Engineering and Methodology*, 6(2): 173-210 (Apr. 1997) Retrieved from the ACM database on Sep. 4, 2002.

Rothermel, G., and Harrold, M.J., "Selecting Tests and Identifying Test Coverage Requirements for Modified Software," Department of Computer Science, Clemson University, ACM (1997). Retrieved from the ACM database on Sep. 4, 2002.

Coppieters, K., "A Cross-Platform Binary Diff," *Dr. Dobb's Journal*, pp. 32, 35-36 (May 1, 1995).

Feldman, S.I. and Brown, C.B. "IGOR: a system for Program Debugging via Reversible Execution," *Proceedings of the ACM SIGPLAN and SIGOPS Workshop on Parallel and Distributed Debugging*, pp. 112-113(1998).

Larus, J.R. "Abstract Execution: A Technique for Efficiently Tracing Programs," from Software Practice & Experience, GB (Chichester, John Wiley & Sons Ltd.) pp. 1241-1258 (Dec. 1, 1990).

"Productivity Tool for Online Tracing of an Assembly LISTING Using a Per Trace File," *IBM Technical Disclosure Bulletin*, (Nov. 1, 1987).

* cited by examiner

EARLY WARNING MECHANISM FOR ENHANCING ENTERPRISE AVAILABILITY

This application is a continuation of U.S. patent application Ser. No. 09/474,679, entitled "EARLY WARNING MECHANISM FOR ENHANCING ENTERPRISE AVAILABILITY", filed Dec. 29, 1999 now U.S. Pat. No. 6,745,383.

BACKGROUND OF THE INVENTION

With the proliferation of the internet and electronic commerce ("eCommerce"), businesses have begun to rely on the continuous operation of their computer systems. Even small disruptions of computer systems can have disastrous financial consequences as customers opt to go to other web sites or take their business elsewhere.

One reason that computer systems become unavailable is failure in the application or operating system code that runs on them. Failures in programs can occur for many reasons, including but not limited to, illegal operations such as dividing by zero, accessing invalid memory locations, going into an infinite loop, running out of memory, writing into memory that belongs to another user, accessing an invalid device, and so on. These problems are often due to program bugs.

Ayers, Agarwal and Schooler (hereafter "Ayers"), "A Method for Back Tracing Program Execution," U.S. application Ser. No. 09/246,619, filed on Feb. 8, 1999 and incorporated by reference herein in its entirety, focuses on aiding rapid recovery in the face of a computer crash. When a computer runs an important aspect of a business, it is critical that the system be able to recover from the crash as quickly as possible, and that the cause of the crash be identified and fixed to prevent further crash occurrences, and even more important, to prevent the problem that caused the crash from causing other damage such as data corruption. Ayers discloses a method for recording a sequence of instructions executed during a production run of the program and outputting this sequence upon a crash.

Traceback technology is also important for purposes other then crash recovery, such as performance tuning and debugging, in which case some system event or program event or termination condition can trigger the writing out of an instruction trace.

The preferred method for traceback disclosed by Ayers is binary instrumentation in which code instrumentation is introduced in an executable. The instrumentation code writes out the trace.

Agarwal, "Test Protection, and Repair Through Binary-Code Augmentation," U.S. Pat. No. 5,966,541, issued on Oct. 12, 1999 and incorporated by reference herein in its entirety, discloses a method of binary instrumentation for aiding in testing programs through test coverage. The instrumentation marks instructions which were executed during a test run. Software test engineers or other testers could then write specific tests for the untested code, thereby improving overall test quality. One of the key aspects of the instrumentation technology is that it introduces virtually no overhead since it adds vew few extra instructions into the code directly, and does not involve expensive procedure calls. Improved testing also helps to discover and fix bugs, thereby resulting in higher availability for the system.

SUMMARY OF THE INVENTION

Traceback is a reactive tool. It promotes recovery when the program has crashed. But it does not usually warn of the possibility of a crash The present invention, on the other hand, inserts binary instrumentation into a program which issues an "early warning" such as an email to an operator when the program enters a block of untested code which has been recently changed. Changed, untested codes are common causes of failures. Early warnings can also be issued upon other events that are likely to cause a failure.

Accordingly, a computer method for issuing an early warning includes determining, using a control flow graph representation of a program, locations in the program at which to insert EW code to monitor for an event. The program is instrumented with EW code which monitors for the event, by inserting EW code at the determined locations. Upon detecting the event, EW code performs an early action warning, or issues an early action.

In at least one embodiment, instrumenting the program is done by first injecting code coverage instrumentation into the program. Then, the code coverage-instrumented program is tested to provide coverage information. Finally, untested blocks are instrumented to perform an early warning action.

Instrumenting the program further comprises determining which program blocks in the program are changed relative to an earlier version of the program. Then, only untested blocks that are changed are instrumented to perform an early warning.

Early warnings in general are issued when an EW-instrumented block is reached. In one embodiment, the event is the reaching of program code which has changed relative to a prior version of the program.

Issuance of an early warning action can be conditional upon execution of the program in a particular environment, such as a production environment.

The issuing of an early warning can include, but is not limited to, sending an email to one or more people such as developers, testers, managers and/or operators, or to another computer system. The email can include information such as a traceback history.

The issuing of an early warning can also include, but is not limited to, writing an early warning log entry into a log file, which can be periodically checked by a human or by a processor. Furthermore, the log file or a portion thereof can be included in the email discussed above.

The issuing of an early warning can also include, but is not limited to, sending a message to a console, where the message causes the change of a human-perceptible characteristic. For example, the characteristic can be the color, visibility, shape, size or blinking state of an icon displayed on the console, or a combination thereof, where the icon is specific to the application. The characteristic can also be the sounding an audible alarm, or alternately, the turning off and on an audible alarm. This, of course, can be combined with the change of the icon's state. The message itself can be sent by various methods, including SNMP protocol traps.

The issuing of an early warning can also include, but is not limited to, placing the program into a wait state, halting the program, sending an alarm to an operator, or triggering a failover.

Furthermore, in some embodiments, EW code can be deactivated for a block after a predetermined number of early warnings have issued for the block. A table can be maintained, for example, to track the number of early warnings issued for each EW-instrumented block.

Alternatively, in some embodiments, EW code can be deactivated for the entire program, for example, after a predetermined number of early warning actions have been performed. This can be accomplished, for example, by checking for a predetermined condition before issuing the early warning, and issuing the early warning only if the predetermined condition is not true. Examples of predetermined conditions include, but are not limited to, a predetermined value stored in a known file or in an environmental variable.

Issuance of an early warning can also occur upon an event such as the execution of a user-inserted assert or warning statement, or before a file is opened, wherein the EW issues if a null pointer about to be passed to a system function. In some embodiments, an EW will issue if the value of an argument to some function exceeds a predetermined range.

In yet another embodiment, the EW code is placed in a loop, and issues an EW if the loop is executed more than a predetermined number of times.

In yet another embodiment, the EW code issues an EW upon the execution of user-marked code.

In another embodiment, the EW code issues an EW when the time duration between execution of two points in the program exceeds a predetermined value. The two points can be, for example, around a system call, a network request call, or a database interaction call.

In yet another embodiment, the EW code issues an EW upon the detection of an untested configuration. This can be implemented, for example, by maintaining a list of test configuration sets which have been tested. A configuration which does not match one of the listed test configuration sets is determined to be an untested configuration. A test configuration set can include, but is not limited to, a record of programs and/or processes and/or load modules that have been tested together during a test phase, a record of files which were opened during a test phase, or just those that were read from or just those that were written to, a record of system resources which were simultaneously open during a test phase. System resources can include, for example, a memory working set, the number of open communication sockets.

In yet another embodiment, the EW code issues an EW upon the creation of a helpdesk ticket.

In another embodiment, the EW code issues an EW before an exception handler passes control to an operating system.

In another embodiment, the EW code can be placed in an exception handler that is part of the executable, where the exception handler is registered with the operating system (OS). The exception handler is called by the OS when the OS determines that the executable has crashed. An example is the structured exception handler mechanism of Windows NT™.

The instrumentation can be of the source code, or the binary code, or can alternatively occur during linking.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
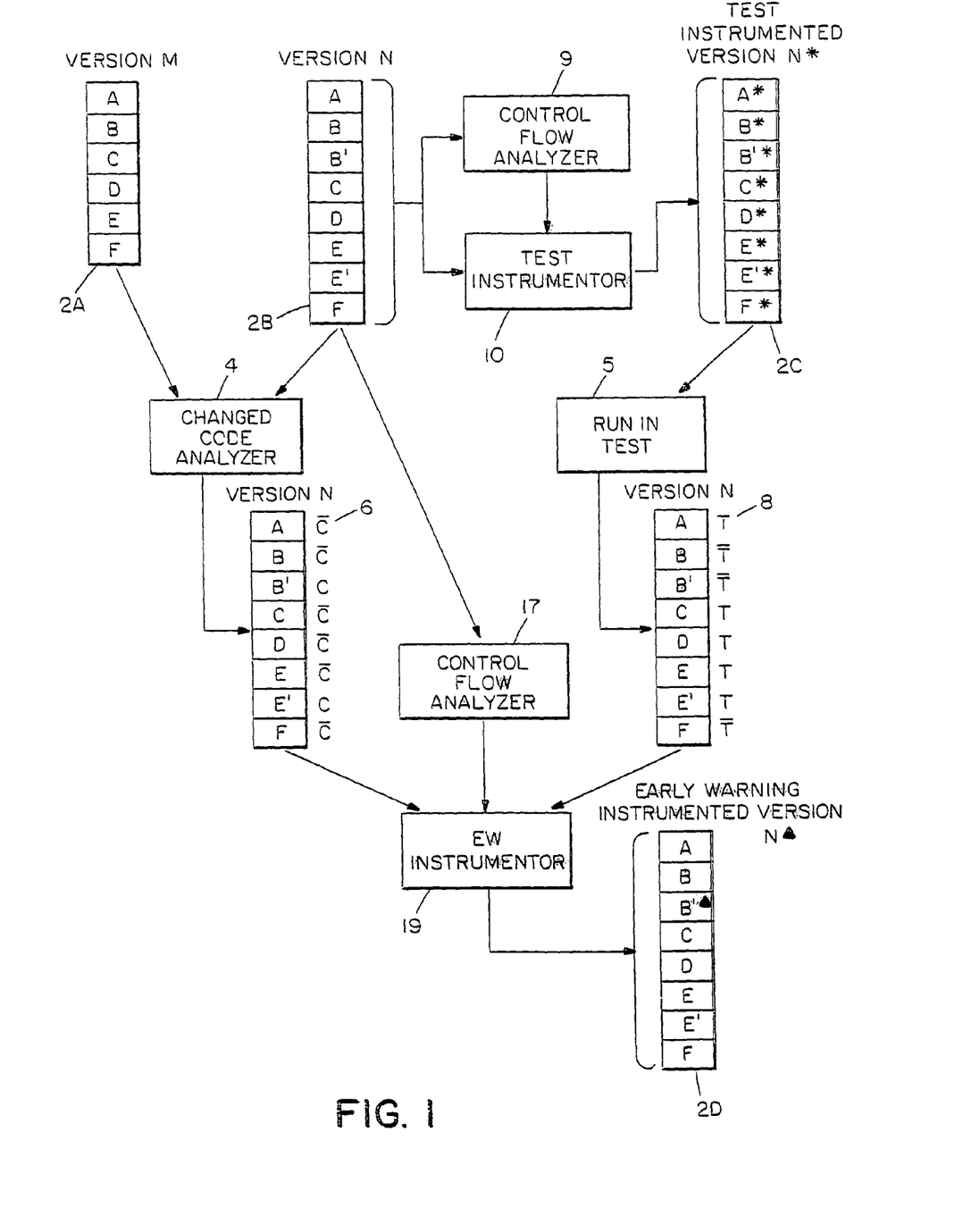
FIG. 1 is a schematic diagram of an embodiment of the present invention.

FIG. 1 is a schematic diagram of an embodiment of the present invention. Generally, there is an earlier version of a computer program, say Version M 2A, and a later version of the computer program, say Version N 2B. For illustrative purposes, assume a control flow analysis reveals that Version M 2A comprises basic blocks A through F.

Version N 2B may have been derived from Version M 2A by inserting new lines of code, by changing lines of code, or by deleting lines of code. Use of a different compiler or assembler, or compiling with environmental variables set to different values from one compile to another, for example, can also result in different versions. In this example, new blocks B' and E' have been inserted after blocks B and E, respectively.

These two versions 2A, 2B are then compared by a changed code analyzer 4, which produces a list of code lines or blocks which have changed. Such an analyzer is described in Witchel, "Method for Determining the Degree to Which Changed Code Has Been Exercised," Ser. No. 09/474,389, filed on the even day herewith and incorporated by reference herein in its entirety, which discloses a test coverage tool that performs "changed code coverage." Lines of code that are changed are marked as changed. Furthermore, lines of code that are impacted by the changes are also marked as changed. In fact, additional statistics can be provided for changed and impacted lines. The changed code analyzer 4 can also compare two source files.

Impacted lines are determined from the changed lines by using control flow and data flow analyses. For example, if a variable's initialization is changed, then all instructions that use that variable in their calculations are impacted. Then, the new Version N 2B is instrumented to obtain coverage data by test instrumentor 10, resulting in version N* 2C. Version N* is tested and coverage data is produced. The lines of code that are executed in test 5 are marked as "T," while those not executed in test 5 are marked as "T̄."

The illustrative output 6 of the changed code analyzer 4 demonstrates the changed code analysis function. For each basic block of the new version, i.e., Version N, a marking appears designating the changed (C) or not changed (C̄) status. The output 8 of test 5 shows the marking of T or T̄, as discussed above. Together, the C and T markings, 6, 8 respectively, are used in creating the EW instrumented version. Thus, for example, block B' has the designation C T̄, indicating that lines of code within block B' have changed with respect to Version M, and have not been tested.

It is well-known that new changes are a common cause of failures. When new changes are untested, yet run in production, there is a high likelihood of failure. By determining, as described above, the lines or basic blocks of code that are changed and not tested, testers can focus their effort on testing these very blocks or lines, since they are likely to cause faults.

The present method and system provide early warnings based on this information. First, a control flow analyzer 17, which may be the same as or different from control flow analyzer 9, analyzes the program 2B to be instrumented. Then, using the resulting control flow analysis, and the C and T information, an early warning (hereafter "EW") instrumentor 17 inserts EW code into those blocks which are determined to be changed and untested, such as block B'. An EW-instrumented version of the program N$^\Delta$ 2D is shown with basic block B'$^\Delta$, which is an EW-instrumented version of basic block B'.

Data flow analysis (not shown) can also be used to aid in the instrumentation.

Furthermore, EW code can be added either by source-level instrumentation or binary-level instrumentation. Other instrumentation methods such as link-time instrumentation can also be utilized.

Figure 2:
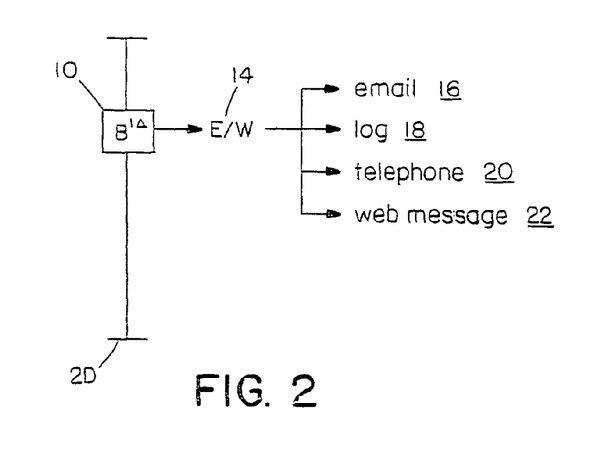
FIG. 2 is a schematic diagram illustrating an early warning.

FIG. 2 illustrates the operation of an EW agent, that is, the inserted code which issues EWs. Vertical line 2C represents the EW-instrumented program of FIG. 1, with only block B'$^\Delta$ being shown discretely. When EW-instrumented block B'$^\Delta$ is reached, the EW code, or agent, issues an early warning 14, which may include, for example, automatic generation and transmittal of an email 16 reporting the event, a log entry 18, an automated telephone call 20, or a message sent over the web to a support group. The message can include a trace record.

FIGS. 3A-3E illustrate various embodiments of EW behavior. Of course, these various embodiments can be combined in actual use. For example, in FIG. 3A, vertical line 50 represents an actual execution run of a program. Only the EW-instrumented blocks 51 are discretely depicted, each with a heavy line indicating the EW code. No scale is intended in FIGS. 3A-3E. That is, there could be zero lines of code between the instrumented blocks, a few lines, or many lines.

Note also that in each of FIGS. 3A-3E, the EW code, indicated by a heavy line, is shown at the beginning of each instrumented block for illustrative purposes. However, it should be understood that the instrumented EW code could in fact be inserted anywhere into a basic block, depending on the situation.

Finally, note that FIGS. 3A-3E represent execution runs, not source code. Thus, some blocks of code which appear in the source or binary code may not appear at all in the execution, while other blocks, for example, block 51, may execute several times in a single execution of the program.

Figure 3A:
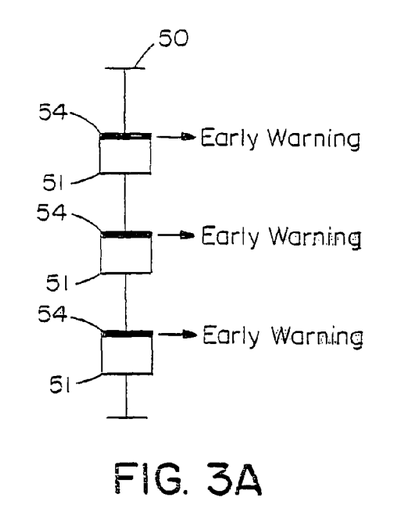
FIGS. 3A-3E are schematic diagrams illustrating the behavior of various embodiments of the present invention.

FIG. 3A demonstrates the simple behavior wherein each EW agent 54 issues an early warning whenever the EW agent 54 is reached.

Figure 3B:
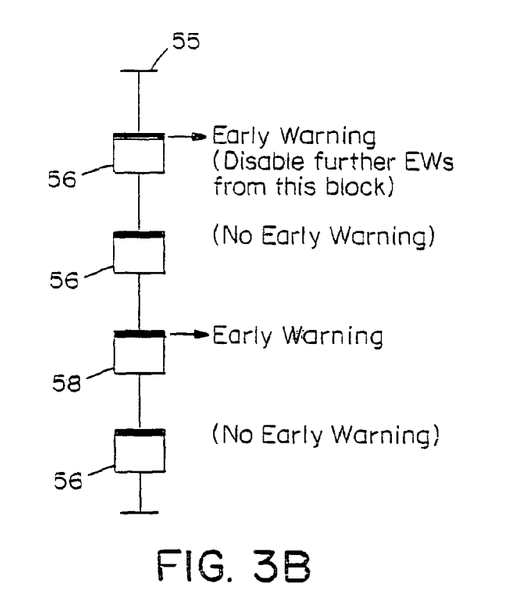

FIG. 3B demonstrates EW behavior for an alternate embodiment, in which, for performance or other reasons, after the first early warning on a given block, early warnings are turned off.

Here, the execution 55 comprises three executions of EW-instrumented block 56 and an execution of EW-instrumented block 58. Upon issuance of the first early warning from a particular EW-instrumented block 56, further issuance of EWs from that block 56 are disabled or inhibited. EWs can still be issued from other blocks when they are reached, however. Here, block 58 is not disabled, and issues its own EW when it is reached.

Figure 4:
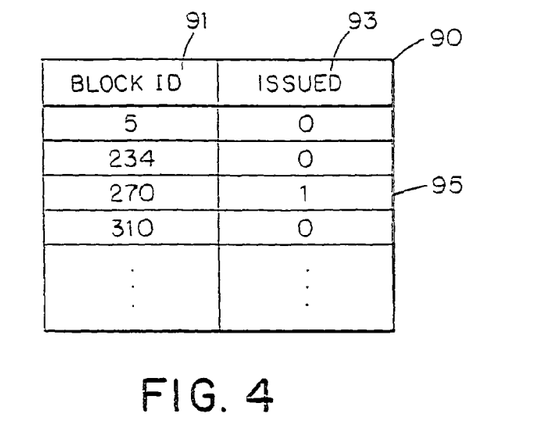
FIG. 4 is a diagram of a table used in the implementation of the embodiment of FIG. 3B

As shown in FIG. 4, this is accomplished, in one embodiment, by maintaining a table 90 of blocks instrumented with early warnings. When an early warning is issued, an indicator is set on the line corresponding to the block. Warnings are issued only after verifying that the indicator is 0.

For example, each entry in the table 90 of FIG. 4 has two fields: a block identifier field 91 and an issued indicator 93. Here, line 95 identifies block 310 as having an issued indicator which is set to 1, indicating that block 310 has issued an early warning. In this embodiment, further early warnings from block 310 are inhibited.

Alternatively, EWs can be disabled after the Nth execution of an EW-instrumented block, for any number N, rather than after the first execution. In this case, the issued indicator field 93 of FIG. 4 can, for example, hold a count value of the number of issued early warnings.

Figure 3C:
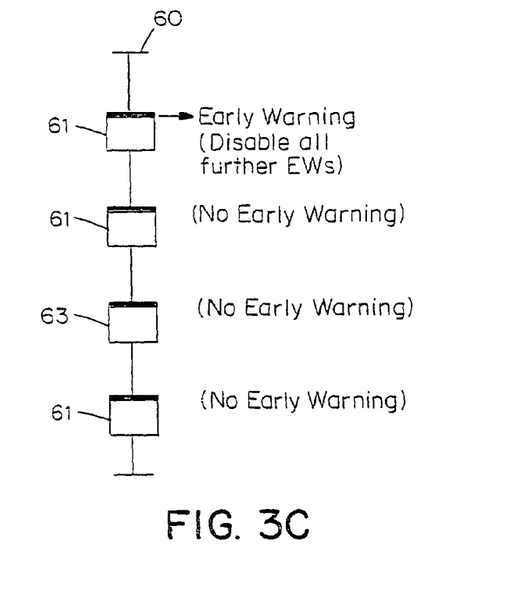

FIG. 3C demonstrates yet another alternate EW behavior, in which early warnings can be shut off for an entire program. That is, if a program issues an EW, then further EWs from that program can be shut off. This can be implemented, for example, by checking, in the EW code, for some value, i.e., shut-off code, in a known file or an environment variable before issuing the early warning. Early warnings can then be turned off or inhibited by writing the shut off code into the particular file or environmental variable.

Here, for execution 60, a first (or Nth) EW disables or inhibits all further EWs. Thus, the first EW agent, in block 61 issues an EW and disables issuance of all further EWs. Later executions of block 61 do not issue an EW, nor does execution of a different EW-instrumented block 63.

Alternatively, EWs can be disabled for selected blocks.

Figure 3D:
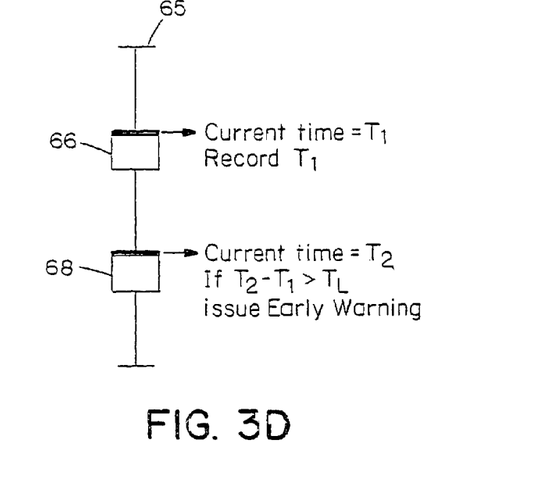

FIG. 3D demonstrates yet another alternate EW behavior for execution 65. Here, a first EW agent, in block 66, records the time at which it is reached, say $T_1$. Later, an EW agent in block 68, noting the time of its own execution, say $T_2$, compares the duration between execution of the two blocks 66, 68, that is $T_2-T_1$, with some predetermined limit $T_L$. If the time between execution of the two blocks 66, 68 exceeds the limit $T_L$, an early warning is issued to indicate an unacceptable slowdown.

Such EW timer checks can be placed around system calls or calls that request network or database interaction. EWs can be fired off if one of these calls is inordinately slow.

Alternatively, an EW could issue if the time between execution of the two blocks is under some predetermined period.

Figure 3E:
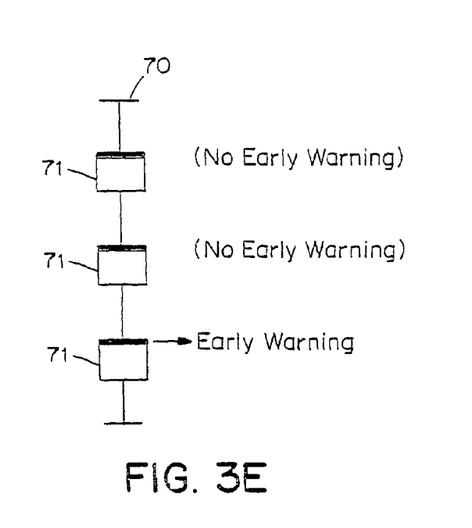

FIG. 3E demonstrates yet another alternate EW behavior for an execution 70. Here, EWs are disabled until the Nth execution of an EW-instrumented block. For example, on the first two executions of block 71, no EW is issued. Only on the third execution of block 71 is an EW issued. Such conditional EW agents can be placed, for example, in loops, where they issue an EW if the loop is executed more than a given number of times. This mechanism catches infinite loops.

Figure 5:
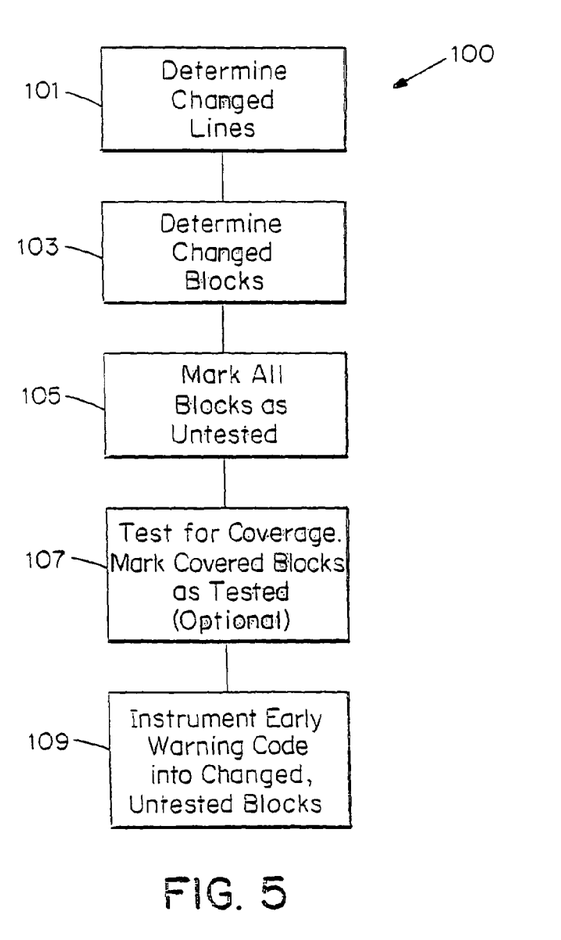
FIG. 5 is a flowchart of the early warning instrumentation process of an embodiment of the present invention.

FIG. 5. is a flowchart 100 of one embodiment of the EW instrumentation process.

At Step 101, the difference between the executables of two versions is determined, for example, as described in Witchel, "Method for Determining the Degree to Which Changed Code Has Been Exercised," Ser. No. 09/474,380, filed on the even day herewith and incorporated by reference herein in its entirety. Control and data flow analyses are performed, for example, as described in Schooler, "A Method for Determining Program Control Flow," Ser. No. 09/210,138, filed on the even day herewith and incorporated by reference herein in its entirety, to aid in the determination of differences. The result is a list of lines of code that are changed and/or impacted, i.e., the "changed lines."

At Step 103, those blocks that are changed are determined from the changed lines. See the Witchel application cited above. Any block with a changed line is a changed block.

At Step 105, all blocks are marked as untested.

At optional Step 107, instrumentation is injected into the executable to test for code coverage. The executable with code coverage instrumentation is then subjected to testing to provide coverage information. In other words, a determination can be made as to which blocks have been tested and which have not.

Then, at Step 109, the blocks that are changed and that have not been tested are further processed by the EW instrumentor 10 of FIG. 1. In this step, EW instrumentation is inserted to provide early warning into those blocks that are changed but not tested.

As discussed with respect to FIG. 2, one embodiment of an early warning action comprises causing one or more messages to be sent by email to one or more people, such as developers, tester, and/or managers, as appropriate.

Alternatively, or in addition, information is written into a log file, which is periodically checked.

Alternatively, an early warning message can be sent to a console, for example using SNMP protocol traps, and displayed. The early warning can optionally change a characteristic of an icon on the display to request that someone review the appropriate log file. Characteristics which can be changed include, but are not limited to: color, shape, size and blinking. Additionally, a sound or audible alarm, or other visual indicator, can be turned on, or alternately turned off and on.

For potentially catastrophic situations, a more strict action can be taken. For example, the application can be put into a wait state, or halted to prevent it from causing damage. An alarm can be sent to the operator, who can alert the appropriate operations personnel.

Further action of an early warning can include, for example, when the early warning code within an application suspects or detects that an application is about to fail or perform very poorly, sending a notification to a failover process so that a failover action can be initiated.

Failover is the mechanism by which an application is restarted on another computer or server when a computer, server or the application fails. The failover process optionally involves notifying message routers or some other higher level software process to send future transactions to the new location. The failover process also optionally involves notifying a higher level software system such as a transaction monitor that the application running on the current computer has failed.

One way that early warning code can suspect or detect that an application is about to fail or has failed, or is about to perform or is performing very poorly, is to place EW code at points in the program which are known to be reached only when the program is about to fail or has failed. In particular, early warning code can be placed just before an exception handler is reached, or alternatively at the start of the exception handler, so that the early warning code is run before the exception handler passes control to the operating system.

Many of the EW-instrumented locations discussed earlier are points in the program where the program is about to fail. One such example is where EW code discovers that a null pointer is about to be referenced as a valid memory location. In this case, the program is about to attempt to access memory through a null pointer, when a correct program would have a valid address in the pointer.

Early warning code is also placed in loops that are executed more than a preset number of times, as discussed with respect to FIG. 3E. This can signal imminent or in-progress poor performance.

Another way to signal poor performance is to measure the time between two program points in test, as discussed with respect to FIG. 3D. Between these program points might be a database access, or network access, or system call. The time interval can be measured by checking system time, which is available on most microprocessors, at two points in the program and taking the difference. If the EW code determines that the time interval falls outside acceptable bounds, established by the instrumentor 10, then an EW can issue that to cause a failover.

Early warnings can also be issued on other events in addition to the execution of untested code that is also changed.

For example, EWs can be issued on other events that can be monitored by instrumentation, such as the execution of a user-inserted assert or warning statement. First, a user can be allowed to intentionally place early warnings into a program.

Second, users commonly put "assert" statements into programs, such as:

assert(deposit_amount<10000)

In the C++ programming language, for example, executing such a statement in a program during the development process typically causes the program to halt if the condition within the parentheses is false. However, it is undesirable to ship code to customers in which asserts can be activated. For such production versions, asserts are typically defined to be null operations. Yet, it can be desirable, from the point of view of a customer running the program, or from the point of view of a software vendor supplying the program, to be able to know when these conditions occur.

User-inserted asserts or warnings typically produce either a determinable, or a predetermined sequence of instructions in the binary. That is, user-inserted asserts or warnings will produce a pattern of instructions in the binary that are recognizable by the EW instrumentor 19. Therefore, an embodiment of the present invention instruments assert or warning statements to issue an EW if the assert condition is in true or false, depending on the implementation.

In another embodiment, all file pointers are tested before the corresponding files are opened. An EW is issued if a null pointer is about to be passed to, for example, some system function.

In addition, EWs can be issued if some argument values exceed some customary ranges.

In yet another embodiment, a user is given the ability to mark code that should cause an early warning to be issued when it is executed. The EW instrumentor 19 recognizes such markings and instruments the code accordingly.

Another event upon which an EW can be issued is the creation of a helpdesk ticket.

Another embodiment maintains a record of programs or load modules that have been tested together during a test phase, as well as a record of the opened files and system resources during test. System resources include, but are not limited to, a memory working set, the number of communication sockets open, and so on. Each such set is called a "test-configuration-set."

Figure 6:
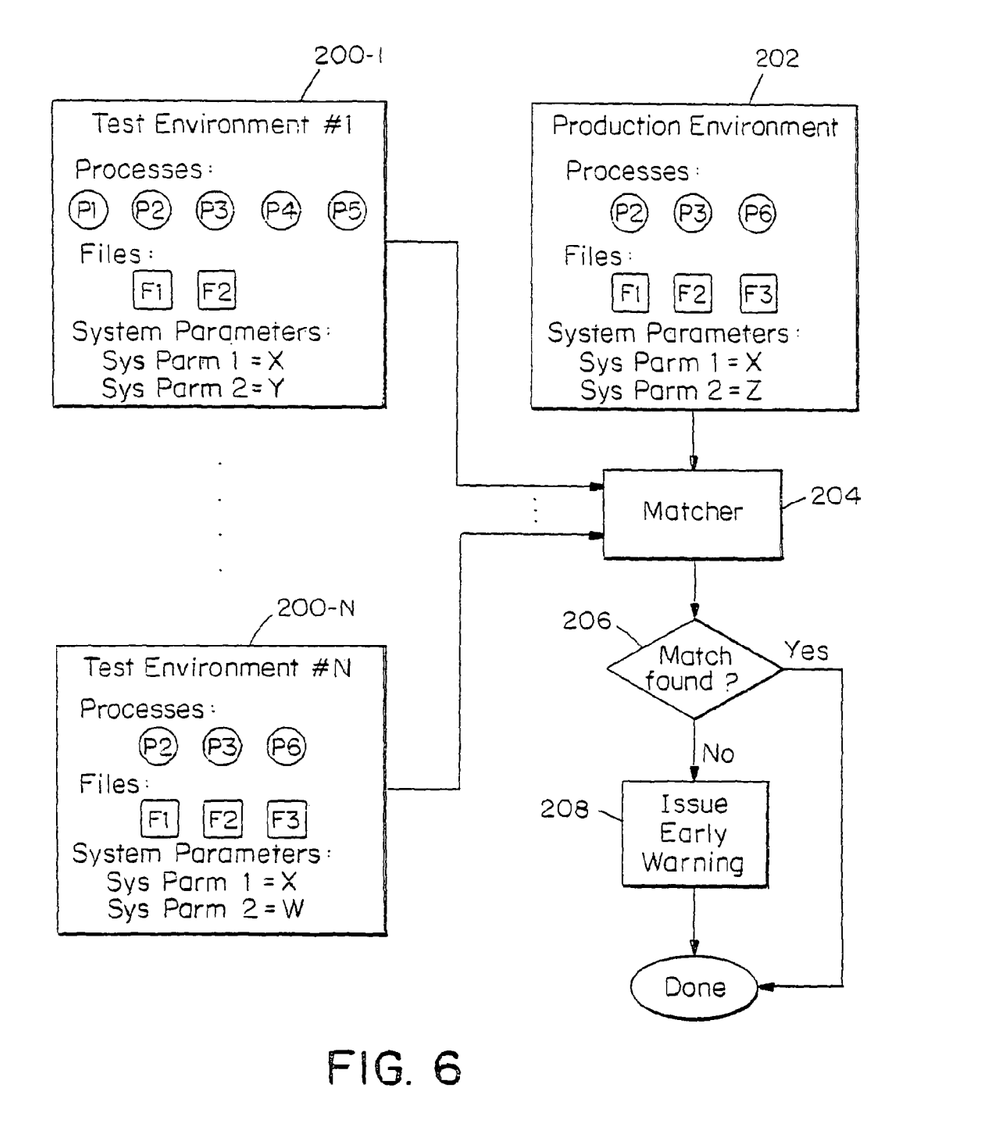
FIG. 6 is a schematic diagram illustrating a test-configuration-set embodiment of the present invention.

FIG. 6 illustrates the concept of a test-configuration EW system. Many test-configuration-sets 200 can be collected, and made available for reading by agents running in the application or in the system during production. For example, test-configuration-set #1 200-1 is defined by processes P1, P2, P3, P4 and P5 running, files F1 and F2 open, and system parameters SysParm1=X and SysParm2=Y for some values X and Y.

Similarly, test-configuration set #N 200-N is defined by processes P2, P3 and P6, files F1, F2 and F3, and system parameters SysParm1=X and SysParm2=W. Of course, in a real application, there could be many more test-configuration-sets and many more processes, files and system parameters than are shown here simply for illustrative purposes.

If the configuration running in production does not match one of the test configurations, then an EW is issued. In the Example of FIG. 6, the production configuration 202 currently has processes P2, P3 and P6 running, files F1, F2 and F3 open and system parameters SysParm1=X and SysParm2=W.

The matcher 204, which is simply code in the EW agent, looks for a match between the current production configuration 202 and any of the test-configuration sets 200. Here, the production configuration does not match either of the illustrated test-configuration-sets 200-1, 200-N. If no match is found with any test-configuration-set 200, as determined at Step 206, then at Step 208, an EW is issued. If a match is found, no EW issues.

Early warnings can also be accompanied by writing out a traceback history into a log file. Alternatively, a traceback history can be sent in an email along with the early warning message.

EWs can also be tied to the creation of a help desk ticket in systems such as Remedy™.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system comprising:
   a processor; and
   a memory, wherein the memory stores:
      a first computer program and a second computer program, wherein the second computer program is a modified version of the first computer program;
      a changed code analyzer;
      test coverage data indicative of lines of code of the second computer program that have been executed during a test run;
      a list of test configuration sets, wherein each of the test configuration sets comprises a record of a plurality of programs that have been tested together by execution of the plurality of programs during a test phase;
      an early warning (EW) instrumentor;
   wherein the changed code analyzer is executable by the processor to produce a change list indicative of one or more changes between the first and second computer programs;
   and wherein the EW instrumentor is executable by the processor to:
      identify one or more locations in the second computer program for inserting EW code to monitor for an event, wherein the one or more locations are indicated as changed in the change list and indicated as untested in the test coverage data; and
      insert EW code in the one or more locations, wherein the EW code is configured to:
         look for a match between a current configuration and any one of the listed test configuration sets; and
         if no match is found, issue an EW action upon detecting an occurrence of the event.

2. The system as recited in claim 1, further comprising a test instrumentor configured to instrument the second computer program to obtain the test coverage data.

3. The system as recited in claim 1, wherein the EW instrumentor is further configured to detect a pattern of instructions in the second computer program that corresponds to a user-inserted assert, and to insert the EW code in the user-inserted assert.

4. The system as recited in claim 1, wherein the EW code is configured to trigger a failover when a time duration between execution of two points in the second computer program exceeds a predetermined value.

5. The system as recited in claim 1, wherein an issuance of the EW action is conditional upon execution of the second computer program in a production environment.

6. The system as recited in claim 1, wherein an issuance of the EW action is conditional upon a value of a configurable parameter.

7. The system as recited in claim 1, wherein an issuance of the EW action is disabled for a selected set of blocks of the second computer program.

8. A method comprising:
   producing a change list indicative of one or more changes between a first computer program and a second computer program, wherein the second computer program is a modified version of the first computer program;
   obtaining test coverage data indicative of lines of code of the second computer program that have been executed during a test run;
   identifying one or more locations in the second computer program for inserting early warning (EW) code to monitor for an event, wherein the one or more locations are indicated as changed in the change list and indicated as untested in the test coverage data;
   inserting EW code in the one or more locations;
   executing the inserted EW code to look for a match between a current configuration and one of a list of test configuration sets, wherein each of the test configuration sets comprises a record of a plurality of programs that have been tested together by execution of the plurality of programs during a test phase; and
   if no match is found, executing the inserted EW code to issue an EW action upon detecting an occurrence of the event.

9. The method as recited in claim 8, wherein the step of obtaining test coverage data comprises:
   instrumenting the second computer program; and
   executing the second computer program in a test environment.

10. The method as recited in claim 8, further comprising:
    detecting a pattern of instructions in the second computer program that corresponds to a user-inserted assert; and
    inserting EW code in the user-inserted assert to issue the EW action.

11. The method as recited in claim 8, wherein the event is a time duration between execution of two points in the second computer program exceeding a predetermined value, and wherein the EW action is a failover.

12. The method as recited in claim 8, wherein the issuing of the EW action is conditional upon execution of the second computer program in a production environment.

13. The method as recited in claim 8, wherein the issuing of the EW action is conditional upon a value of a configurable parameter.

14. The method as recited in claim 8, wherein the issuing of the EW action is disabled for a selected set of blocks of the second computer program.

15. A computer usable storage medium comprising instructions executable to:
    produce a change list indicative of one or more changes between a first computer program and a second computer program, wherein the second computer program is a modified version of the first computer program;
    obtain test coverage data indicative of lines of code of the second computer program that have been executed during a test run;
    identify one or more locations in the second computer program for inserting early warning (EW) code to monitor for an event, wherein the one or more locations are indicated as changed in the change list and indicated as untested in the test coverage data;
    insert EW code in the one or more locations;

execute the inserted EW code to look for a match between a current configuration and one of a list of test configuration sets, wherein each of the test configuration sets comprises a record of a plurality of programs that have been tested together by execution of the plurality of programs during a test phase; and if no match is found, execute the inserted EW code to issue an EW action upon detecting an occurrence of the event.

16. The computer usable storage medium as recited in claim 15, wherein, to obtain the test coverage data, the instructions are further executable to:

inject test coverage instrumentation in the second computer program; and execute the second computer program in a test environment.

17. The computer usable storage medium as recited in claim 15, wherein the instructions are further executable to:

detect a pattern of instructions in the second computer program that corresponds to a user-inserted assert; and insert EW code in the user-inserted assert to issue the EW action.

18. The computer usable storage medium as recited in claim 15, wherein the event is a time duration between execution of two points in the second computer program exceeding a predetermined value, and wherein the EW action is a failover.

19. The computer usable storage medium as recited in claim 15, wherein an issuance of the EW action is conditional upon execution of the second computer program in a production environment.

20. The computer usable storage medium as recited in claim 15, wherein an issuance of the EW action is conditional upon a value of a configurable parameter.

21. The computer usable storage medium as recited in claim 15, wherein an issuance of the EW action is disabled for a selected set of blocks of the second computer program.

* * * * *